(12) United States Patent
Nawata et al.

(10) Patent No.: US 11,467,086 B2
(45) Date of Patent: Oct. 11, 2022

(54) SAMPLE INSPECTION APPARATUS

(71) Applicant: Canon Medical Systems Corporation, Otawara (JP)

(72) Inventors: Isao Nawata, Otawara (JP); Takeshi Yamauchi, Utsunomiya (JP); Shoichi Kanayama, Otawara (JP)

(73) Assignee: Canon Medical Systems Corporation, Otawara (JP)

( * ) Notice: Subject to any disclaimer, the term of this patent is extended or adjusted under 35 U.S.C. 154(b) by 0 days.

(21) Appl. No.: 17/005,614

(22) Filed: Aug. 28, 2020

(65) Prior Publication Data

US 2021/0063309 A1 Mar. 4, 2021

(30) Foreign Application Priority Data

Aug. 30, 2019 (JP) .............................. JP2019-158525

(51) Int. Cl.
*G01N 21/51* (2006.01)
*G01N 21/552* (2014.01)
*G01N 21/41* (2006.01)

(52) U.S. Cl.
CPC ........... *G01N 21/51* (2013.01); *G01N 21/552* (2013.01); *G01N 2021/4166* (2013.01)

(58) Field of Classification Search
CPC ...... G01N 21/25; G01N 21/453; G01N 21/55; G01N 21/85; G01N 21/95; G01N 2021/6467; G01N 2021/845; G01N 21/35; G01N 33/1826; G01N 33/44; G01N 33/585; G01N 33/68; G01N 1/2205; G01N 1/2273; G01N 1/2813; G01N 15/0625; G01N 15/0637; G01N 15/0656; G01N 15/1056; G01N 2001/2833; G01N 2015/0038; G01N 2015/0046; G01N 2015/03; G01N 2015/142; G01N 2021/4742;
(Continued)

(56) References Cited

U.S. PATENT DOCUMENTS 9,274,104 B2    3/2016 Tono et al.
9,310,300 B2 *  4/2016 Alt ..................... G01N 21/6428
(Continued)

FOREIGN PATENT DOCUMENTS

JP    2007-525651 A      9/2007
JP    2015025820 A  *    2/2015
(Continued)

*Primary Examiner* — Michael P Stafira
(74) *Attorney, Agent, or Firm* — Oblon, McClelland, Maier & Neustadt, L.L.P.

(57) ABSTRACT

According to one embodiment, a sample inspection apparatus includes a photodetection circuitry, an image sensor, processing circuitry, and an output interface. The photodetection circuitry has light incident on an optical waveguide in an inspection container and detects the light having propagated within the optical waveguide and coming out of the optical waveguide. The image sensor acquires an image signal for the optical waveguide, using scattered light originated from the light propagating within the optical waveguide. The processing circuitry acquires one or more inspection index values based on at least one of an output of the photodetection circuitry or an output of the image sensor. The output interface outputs a result of processing by the processing circuitry.

10 Claims, 8 Drawing Sheets

(58) Field of Classification Search
CPC ... G01N 2021/4759; G01N 2021/8585; G01N 21/17; G01N 21/6489; G01N 21/88; G01N 21/94; G01N 27/72; G01N 27/745; G01N 33/574; G01N 33/6851; G01N 33/6893; G01N 1/30; G01N 2015/0003; G01N 2015/025; G01N 2015/1402; G01N 2021/4173; G01N 2021/651; G01N 2021/8822; G01N 2035/00356; G01N 2035/00425; G01N 2035/042; G01N 2035/0422; G01N 2035/0425; G01N 2035/103; G01N 21/8483; G01N 21/956; G01N 2201/0693; G01N 2201/10; G01N 2223/419; G01N 23/046; G01N 33/15; G01N 33/5094; G01N 33/542; G01N 33/5436; G01N 33/56911; G01N 35/00871; G01N 35/1072; G01N 15/00; G01N 15/1427; G01N 2015/1445; G01N 2015/1452; G01N 2015/1472; G01N 2015/1477; G01N 2021/0367; G01N 2021/1765; G01N 2021/4723; G01N 2021/772; G01N 2021/775; G01N 2021/7796; G01N 2035/00158; G01N 21/4738; G01N 21/53; G01N 21/783; G01N 21/84; G01N 21/8851; G01N 21/896; G01N 21/9027; G01N 21/95607; G01N 21/958; G01N 2201/0697; G01N 2201/088; G01N 33/4833; G01N 33/49; G01N 33/50; G01N 33/561; G01N 33/5695; G01N 35/08; G01N 15/0205; G01N 15/1456; G01N 2015/0019; G01N 2015/0288; G01N 2015/1481; G01N 2021/154; G01N 2021/5903; G01N 2021/855; G01N 2021/8848; G01N 2021/95615; G01N 2035/00366; G01N 21/15; G01N 21/274; G01N 21/33; G01N 21/3504; G01N 21/359; G01N 21/763; G01N 21/8507; G01N 21/9505; G01N 21/9515; G01N 21/95623; G01N 21/95684; G01N 2201/02; G01N 2201/06; G01N 2201/0668; G01N 2201/0683; G01N 2201/108; G01N 2201/125; G01N 2201/127; G01N 2223/612; G01N 2333/195; G01N 2333/4737; G01N 2333/76; G01N 2440/32; G01N 27/416; G01N 27/44713; G01N 27/44726; G01N 27/44791; G01N 2800/26; G01N 2800/52; G01N 33/02; G01N 33/56938; G01N 33/56972; G01N 33/587; G01N 33/6827

See application file for complete search history.

(56) References Cited

U.S. PATENT DOCUMENTS

| | | | |
|---|---|---|---|
| 2004/0061860 A1* | 4/2004 | Naya | G01N 21/553 |
| | | | 356/445 |
| 2006/0269930 A1* | 11/2006 | Robotti | G01N 33/54353 |
| | | | 435/6.11 |
| 2013/0309779 A1* | 11/2013 | Kasai | G01N 33/54373 |
| | | | 436/501 |
| 2015/0226733 A1 | 8/2015 | Verschuren et al. | |
| 2015/0355089 A1* | 12/2015 | Takase | G01N 29/223 |
| | | | 422/82.11 |

FOREIGN PATENT DOCUMENTS

| | | | | |
|---|---|---|---|---|
| JP | 5792489 | B2 * | 10/2015 | |
| JP | 5814806 | B2 | 11/2015 | |
| JP | 6205041 | B2 | 9/2017 | |
| WO | WO 2005/008222 | A2 | 1/2005 | |
| WO | WO-2005085810 | A1 * | 9/2005 | G01N 21/648 |
| WO | WO-2012105182 | A1 * | 8/2012 | G01N 33/54333 |
| WO | WO-2015132347 | A1 * | 9/2015 | G01N 21/7703 |
| WO | WO-2017059425 | A1 * | 4/2017 | G02B 6/3598 |
| WO | WO-2018012436 | A1 * | 1/2018 | G01N 21/41 |
| WO | WO-2020118255 | A1 * | 6/2020 | B01L 3/502746 |

* cited by examiner

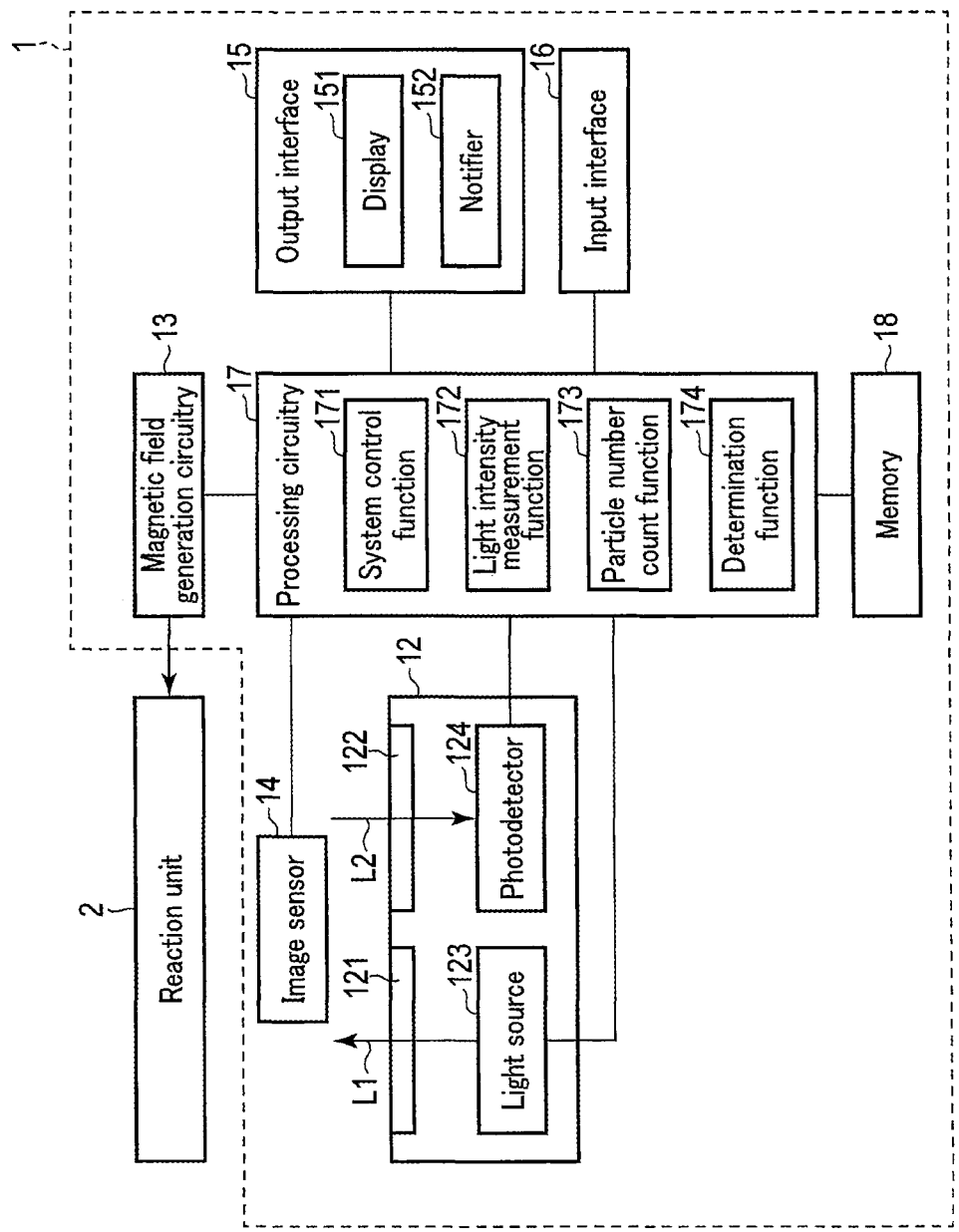
F I G. 1

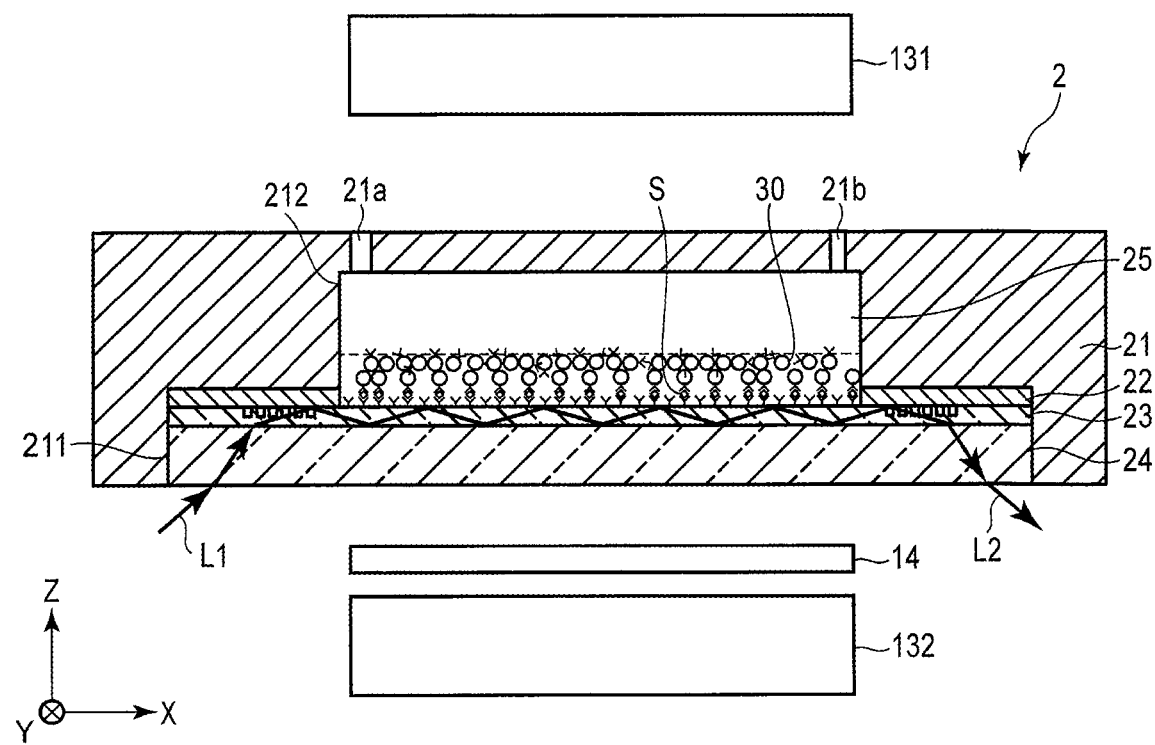
F I G. 10
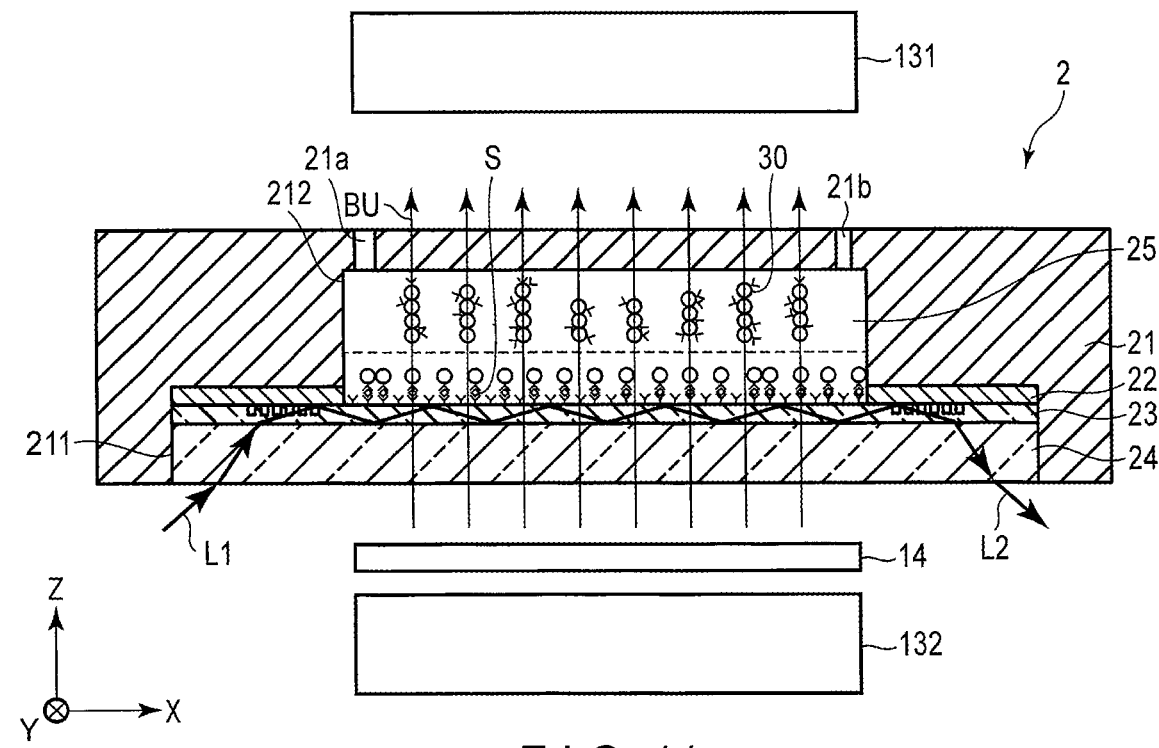
F I G. 11

SAMPLE INSPECTION APPARATUS

CROSS-REFERENCE TO RELATED APPLICATIONS

This application is based upon and claims the benefit of priority from Japanese Patent Applications No. 2019-158525, filed Aug. 30, 2019; and No. 2020-141934, filed Aug. 25, 2020; the entire contents of both of which are incorporated herein by reference.

FIELD

Embodiments described herein relate generally to a sample inspection apparatus.

BACKGROUND

Sample inspection apparatuses are in practical use, which are adapted to utilize antigen-antibody reactions to check if there is a target substance in a measurement sample. Such a sample inspection apparatus, for example, measures the intensity of light propagating within an optical waveguide set in an inspection container containing the measurement sample. The presence or absence of the target substance in the measurement sample is then determined with reference to the light changing its intensity according to the state of reaction that takes place in the container.

The sample inspection apparatuses of this type use attenuation of light, so they allow for sensitive, quantitative measurement. However, how the light propagating within an optical waveguide would attenuate is influenced by the thickness of the optical waveguide employed, and as such, uniform measurement sensitivity may not always be expected. Also, it is often the case that when a measurement sample contains the target substance in an amount equal to or greater than a given upper limit, or equal to or below a given lower limit, the light intensity after the reaction does not show a distinct attenuation from the light intensity before the reaction. That is, accurate determination for the target substance in a measurement sample is possible only when the concentration of the target substance is in a limited range.

BRIEF DESCRIPTION OF THE DRAWINGS

FIG. 1 is a block diagram showing a functional configuration of a sample inspection apparatus according to a first embodiment.

FIG. 10 is a sectional view showing a state inside the reaction mechanism at a time point in the succeeding half of the period from time t2 to time t3 indicated in the timing chart of FIG. 5.

FIG. 11 is a sectional view showing a state inside the reaction mechanism at a time point between time t3 and time t4 indicated in the timing chart of FIG. 5.

DETAILED DESCRIPTION

Figure 2:
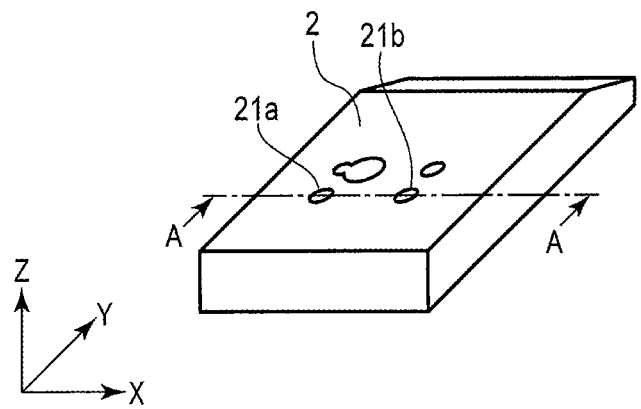
FIG. 2 is a perspective view of the reaction unit shown in FIG. 1.

In general, according to one embodiment, a sample inspection apparatus includes a photodetection circuitry, an image sensor, processing circuitry, and an output interface. The photodetection circuitry has light incident on an optical waveguide in an inspection container and detects the light having propagated within the optical waveguide and coming out of the optical waveguide. The image sensor acquires an image signal for the optical waveguide, using scattered light originated from the light propagating within the optical waveguide, the scattered light being scattered by one or more particles in a vicinity of the optical waveguide. The processing circuitry acquires one or more inspection index values based on at least one of an output of the photodetection circuitry or an output of the image sensor. The output interface outputs a result of processing by the processing circuitry.

Now, the embodiments will be described with reference to the drawings.

First Embodiment

FIG. 1 is a block diagram showing a functional configuration of a sample inspection apparatus according to the first embodiment. The sample inspection apparatus of FIG. 1, denoted by reference symbol 1, includes photodetection circuitry 12, magnetic field generation circuitry 13, an image sensor 14, an output interface 15, an input interface 16, processing circuitry 17, and a memory 18. The sample inspection apparatus 1 also includes a support (not illustrated) for supporting a later-described reaction unit 2.

The photodetection circuitry 12 is adapted to have light incident on the reaction unit 2 and to detect the light coming out of the reaction unit 2. The photodetection circuitry 12 includes an emission part 121, light-receiving part 122, a light source 123, and a photodetector 124. The photodetection circuitry 12 is one example of an optical unit.

The emission part 121 is an emission window and it can serve the purpose with at least an opening. For example, the emission part 121 may be covered with an optical glass, resin, or the like as long as it remains transparent to the light from the light source 123 (that is, as long as the amount of light absorbed by such a cover, etc. is ignorable).

The light source 123 is adapted to emit a light beam (light L1) under the control of the processing circuitry 17. This light L1 is generated from a laser diode (LD), light emitting diode (LED), or the like, and emitted via the emission part 121. The light L1 may also be shaped into a substantially parallel beam by a separately-provided lens, etc. The light source 123 may adopt, for example, diodes such as LD's and LED's, as well as a xenon lamp, etc.

The light-receiving part 122 is a light-receiving window and it can serve the purpose with at least an opening. For example, the light-receiving part 122 may be covered with an optical glass, transparent resin, or the like as long as it remains transparent to the light that will enter the photodetector 124.

The photodetector 124 is adapted to detect a light beam (light L2) having entered the light-receiving part 122. The photodetector 124 may adopt, for example, photodiodes, a photomultiplier tube, etc.

The magnetic field generation circuitry 13 is adapted to generate magnetic fields under the control of the processing circuitry 17. The magnetic field generation circuitry 13 includes an upward magnetic field applicator 131 and a downward magnetic field applicator 132 as will be discussed. The magnetic field generation circuitry 13 is one example of a magnetic field generator.

The upward magnetic field applicator 131 and the downward magnetic field applicator 132 are constituted by, for example, a permanent magnet, an electric magnet, etc. When in operation, the upward magnetic field applicator 131, the downward magnetic field applicator 132, and the reaction unit 2 are vertically arranged in the sample inspection apparatus 1. With the reaction unit 2 supported by the support, the upward magnetic field applicator 131 is located above the reaction unit 2 and the downward magnetic field applicator 132 is located below the reaction unit 2. In other words, the upward magnetic field applicator 131 and the downward magnetic field applicator 132 are designed so that they can interpose the reaction unit 2 therebetween.

The upward magnetic field applicator 131 is adapted to generate vertically upward magnetic force for the reaction unit 2. The downward magnetic field applicator 132 is adapted to generate vertically downward magnetic force for the reaction unit 2.

The image sensor 14 is realized by, for example, a charge-coupled device (CCD) sensor, a complementary metal-oxide semiconductor (CMOS) image sensor, etc. The image sensor 14 is disposed at a position that is vertically below the reaction unit 2 when supported by the support. The image sensor 14 is adapted to receive scattered light having occurred in the reaction unit 2 and to convert the received light into electric signals, i.e., image signals.

The output interface 15 includes a display 151, a notifier 152, etc., and it is one example of an outputter. The display 151 is adapted to display various information items according to instructions from the processing circuitry 17. As the display 151, any display equipment may be discretionarily employed, and examples of such a display include a liquid crystal display, an organic electroluminescence (EL) display, an LED display, a plasma display, a cathode ray tube (CRT) display, etc. The notifier 152 is adapted to issue various sounds according to instructions from the processing circuitry 17, including, for example, an alarm, a sound indicative of completion of measurement, etc. The notifier 152 may be realized by, for example, a speaker, etc.

The input interface 16 is adapted to receive various input operations from a user and converts the received input operations into electrical signals for output to the processing circuitry 17. The input interface 16 is connected to one or more input devices such as, for example, membrane switches, a touch panel, a touch pad, etc. each allowing the input of instructions through contacting the operation screen, and other components or devices such as switches, buttons, a joystick, a trackball, etc.

The memory 18 is a storage device for storing various information sets, and the examples of such a storage device include a random access memory (RAM), a read only memory (ROM), a solid state drive (SSD), a hard disk drive (HDD), and an integrated-circuit storage device. The memory 18 may at the same time be a drive unit or the like, adapted to read and write various information sets from and to portable storage media such as a flash memory, a CD-ROM, a DVD, etc. Note that it is not a requisite to realize the memory 18 by a single storage device. For example, the memory 18 may be realized by multiple storage devices.

The memory 18 also stores one or more control programs, etc., according to the embodiment. In an exemplary implementation, such programs, etc. may be prestored in the memory 18. In another exemplary implementation, they may be stored and distributed in the form of non-transitory storage media, and then read from the media for installation in the memory 18. Or, the control programs may be, for example, downloaded from a network for installation in the memory 18.

The processing circuitry 17 is a processor functioning as a control center of the sample inspection apparatus 1, and is one example of processing circuitry. The processing circuitry 17 is adapted to run the programs stored in the memory 18, etc. to realize functions corresponding to the respective programs, including a system control function 171, a light intensity measurement function 172, a particle number count function 173, and a determination function 174. Note that the present embodiment will be described assuming that a single physical processor realizes the system control function 171, the light intensity measurement function 172, the particle number count function 173, and the determination function 174. However, the embodiment is not limited to such a configuration. For example, multiple independent processors may be combined to form the processing circuitry to have the respective processors run the programs, so that the system control function 171, the light intensity measurement function 172, the particle number count function 173, and the determination function 174 will be realized. The processing circuitry 17 performing the light intensity measurement function 172 is one example of a first processor. The processing circuitry 17 performing the particle number count function 173 is one example of a second processor. The processing circuitry 17 performing the determination function 174 is one example of a determiner.

Operations implemented with the system control function 171 may be realized by hardware, software, or the combination of hardware and software. Operations implemented with the light intensity measurement function 172 may be realized by hardware, or the combination of hardware and software. Operations implemented with the particle number count function 173 may be realized by hardware, or the combination of hardware and software. Operations implemented with the determination function 174 may be realized by hardware, or the combination of hardware and software.

The system control function 171 is a function to take total control over the components of the sample inspection apparatus 1 based on information input via the input interface 16.

The light intensity measurement function 172 is a function to control the components of the sample inspection apparatus 1 for measurement of light intensity, and it may also be regarded as one example of the first processor. More specifically, the processing circuitry 17 with the light intensity measurement function 172 controls timings for the light source 123 to perform its operations. The operations of the light source 123 include, for example, a blinking operation to repeat alternately turning on and off at predetermined time intervals, and a lighting operation to keep an on state. In an exemplary implementation, the light intensity measurement employs the blinking operation.

Also, the processing circuitry 17 with the light intensity measurement function 172 controls timings for the magnetic field generation circuitry 13 to perform application of magnetic fields. The magnetic fields to apply include, for example, a downward magnetic field that generates vertically downward magnetic force, and an upward magnetic field that generates vertically upward magnetic force.

Furthermore, the processing circuitry 17 with the light intensity measurement function 172 monitors light intensity information output from the photodetection circuitry 12. Based on changes in the light intensity that occur in the course of the reaction in the reaction unit 2, the processing circuitry 17 acquires a first inspection index value for an amount of target substance S in a measurement sample. For example, as the first inspection index value, the processing circuitry 17 acquires a value for the content of the target substance S (such as a concentration of the target substance S) based on changes in the light intensity occurring in the course of the reaction in the reaction unit 2. More concretely, the concentration of the target substance S in this example may be calculated based on comparison between the light intensity before an antigen-antibody reaction, i.e., a reference light intensity, and the light intensity after the antigen-antibody reaction (e.g., at the end of the light intensity measurement).

According to one concrete implementation, the processing circuitry 17 calculates a falling rate of the light intensity which indicates how low the light intensity after the antigen-antibody reaction is with reference to the light intensity before the antigen-antibody reaction. The processing circuitry 17 then obtains the concentration of the target substance S that corresponds to the calculated falling rate of the light intensity, using calibration curve data indicative of the relationship between the falling rate of the light intensity and the concentration of the target substance S. Such calibration curve may be stored in the memory 18.

The particle number count function 173 is a function to control the components of the sample inspection apparatus 1 for counting the number of particles, and it may also be regarded as one example of the second processor. More specifically, the processing circuitry 17 with the particle number count function 173 controls timings for the light source 123 to perform its operations. In an exemplary implementation, the particle number counting employs the lighting operation.

Also, the processing circuitry 17 with the particle number count function 173 controls timings for the image sensor 14 to perform imaging. Based on an image signal output from the image sensor 14, the processing circuitry 17 acquires a second inspection index value for an amount of the target substance S. According to one concrete, exemplary implementation, the processing circuitry 17 generates an image from the image signal output from the image sensor 14. The processing circuitry 17 acquires, as the second inspection index value, information included in the generated image such as, for example, the number or the density of particles having a light intensity higher than a predetermined value, one or more other index values of different type or category, or any combination thereof. Note that the second inspection index value may adopt an average, a sum, a variance, etc. of the light intensity values detected using the image sensor 14.

The determination function 174 is a function to determine, based on the result of the light intensity measurement and/or the result of the particle number counting, if there is a target substance in a measurement sample and also how much target substance is included there. That is, the determination function 174 determines the presence or absence, and the extent of inclusion, of a target substance. In the disclosure herein, "the presence or absence, and the extent of inclusion, of a target substance" may represent, for example, a negative or a positive state. According to one exemplary configuration, the processing circuitry 17 with the determination function 174 determines "positive" if the concentration of the target substance S is equal to or higher than a threshold (first threshold), and determines "negative" if the concentration of the target substance S is lower than this threshold. Also in the exemplary configuration, the processing circuitry 17 with the determination function 174 determines "positive" if the counted number of particles is equal to or greater than a threshold (second threshold), and determines "negative" if the counted number of particles is less than this threshold.

Next, description will be given of the reaction unit 2, which is a component attachable to the sample inspection apparatus 1. The reaction unit 2 may also be called an inspection container, a reaction container, a reaction cartridge, or the like. The reaction unit 2 may be used for various purposes including, for example, a virus check for influenza viruses, adenoviruses, respiratory syncytial (RS) viruses, and so on.

Figure 3:
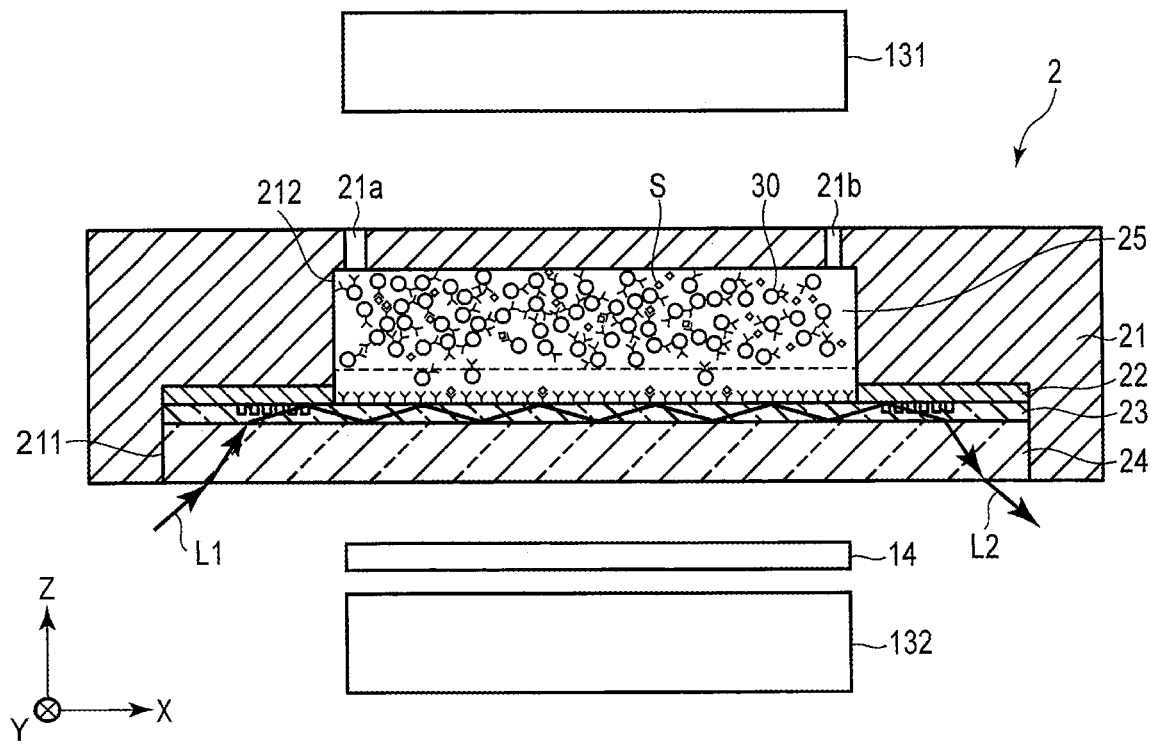
FIG. 3 is a sectional view showing the detailed structure of a reaction mechanism, including a section taken along the line A-A indicated in FIG. 2.

FIG. 2 is a perspective view of the reaction unit 2 shown in FIG. 1. FIG. 3 is a sectional view showing the detailed structure of a reaction mechanism, including a section taken along the line A-A indicated in FIG. 2. The reaction unit 2 shown in FIGS. 2 and 3 includes a housing 21, a double-sided tape 22, an optical waveguide 23, and a transparent substrate 24.

The housing 21 is, for example, constituted by acrylonitrile butadiene styrene (ABS) resin and has a substantially rectangular prism shape. The housing 21 may be colored black for light blocking effect. The housing 21 has a substantially quadrilateral first recess 211 in its bottom. Also, there is a substantially quadrilateral second recess 212 across part of the upper wall within the first recess 211. In the upper wall within the second recess 212, a through-hole 21a upwardly penetrating the housing 21 opens near one edge, and a through-hole 21b upwardly penetrating the housing 21 opens near the opposite edge.

The double-sided tape 22 is disposed so that its upper face tightly contacts the upper wall within the first recess 211 of the housing 21 and its side faces tightly contact the respective side walls within the first recess 211. The double-sided tape 22 is not provided at the portion overlapping the second recess 212 of the housing 21, and as such, it is of a frame-like shape.

The optical waveguide 23 is constituted by one or more light transmissive materials such as, for example, quartz glass, silicon, thermosetting resin, photo-curable resin, and so on. Examples of the thermosetting resin that can be employed here includes phenol resin, epoxy resin, acrylic resin, etc. The optical waveguide 23 is disposed so that part of its upper face tightly contacts the lower face pf the double-sided tape 22 while the remaining part of the upper face comes in front of the space within the second recess 212. The side faces of the optical waveguide 23 are in tight contact with the respective side walls within the first recess 211. Note that said part of the upper face of the optical waveguide 23 that faces the space within the second recess 212 carries a substance immobilized thereon and having a property of specifically reacting with the target substance S.

The transparent substrate 24 is constituted by one or more light transmissive materials. The transparent substrate 24 is disposed so that its upper face tightly contacts the lower face of the optical waveguide 23 and its side faces tightly contact the respective side walls within the first recess 211. The double-sided tape 22, the transparent substrate 24, and the inner walls of the housing 21 that enclose a reaction chamber 25 (described below) physically protect the optical waveguide 23.

In the housing 21, the reaction chamber 25 is provided, which is delimited by the upper end of the second recess 212, the side walls within the second recess 212, the side faces of the double-sided tape 22, and the upper face of the optical waveguide 23 that faces the space within the second recess 212. For inspection, the reaction chamber 25 is injected with an inspection liquid as a mixture of aqueous solution, a reagent ingredient 30, and a sample (specimen). What is shown in FIG. 3 is an exemplary state of the reaction unit 2 containing the inspection liquid in the reaction chamber 25. The inspection liquid may instead be called a measurement sample or the like.

Now, the operations (measurement operations) performed by the sample inspection apparatus 1 attached with the reaction unit 2 for checking the presence or absence, and the extent of inclusion, of the target substance S in the measurement sample will be described. The description will assume the reagent ingredient 30 to be an ingredient containing a first antibody with a property of binding to the target substance S as an antigen, and a magnetic particle supporting the first antibody. It will also be assumed that the substance immobilized on the upper face of the optical waveguide 23, i.e., on the bottom wall of the reaction chamber 25 in the reaction unit 2, is a second antibody with a property of binding to the target substance S as an antigen at a site different from the site to which the first antibody binds.

First off, a user from medical staff, etc. prepares the inspection liquid by mixing a sample (specimen) taken from a patient, etc. with a solution of the reagent ingredient 30 and a solvent (pure water). The user then injects the prepared inspection liquid into the reaction chamber 25 from, for example, the through-hole 21a of the reaction unit 2. With this injection, air is discharged from the through-hole 21b of the reaction unit 2. The reaction chamber 25 is thus filled with the inspection liquid as shown in FIG. 3. Also, the upper face of the optical waveguide 23, functioning as the bottom wall of the reaction chamber 25, is brought in contact with the inspection liquid.

Figure 4:
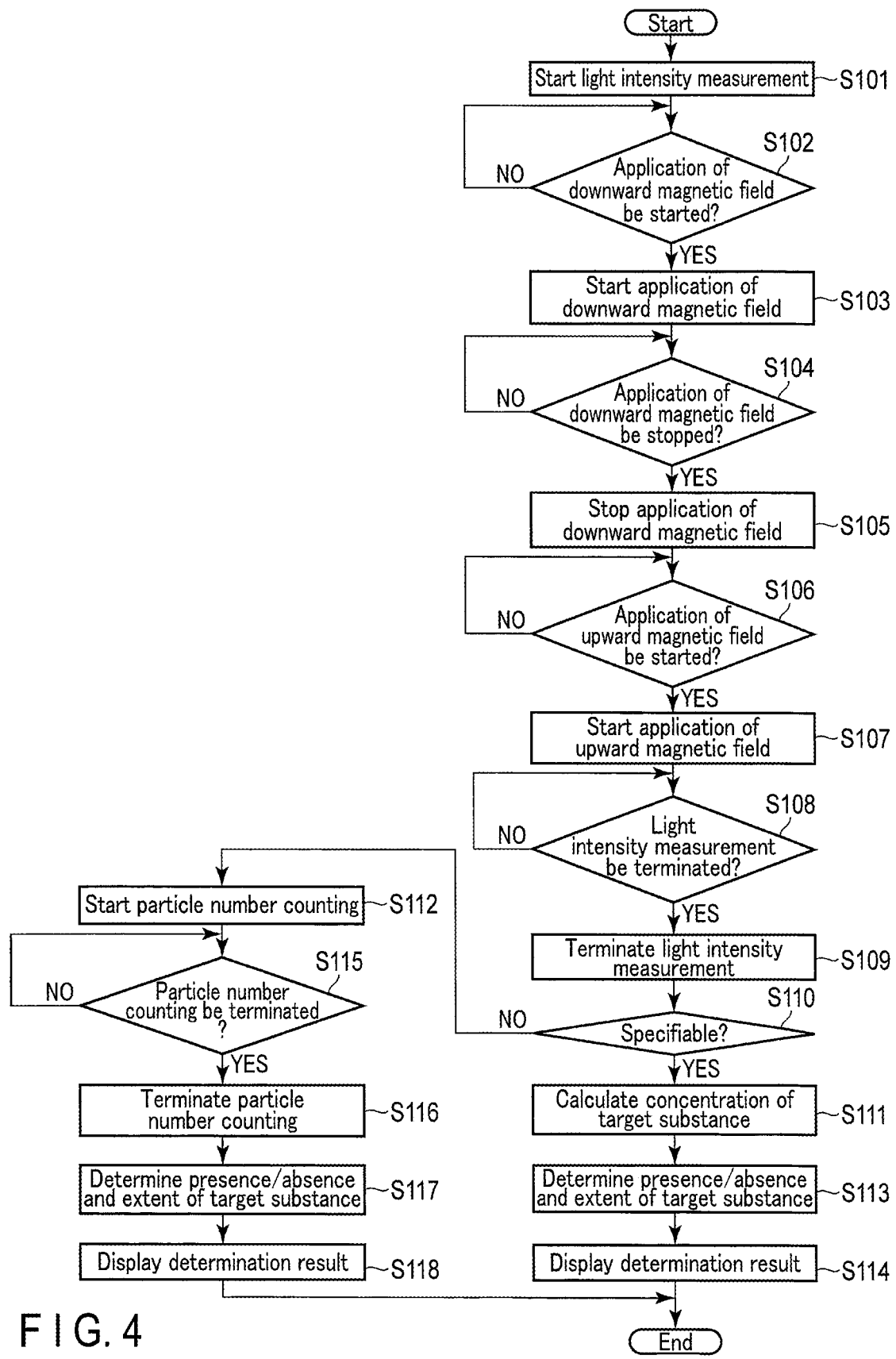
FIG. 4 is a flowchart for explaining one example of a sequence of measurement operations according to the first embodiment.
Figure 5:
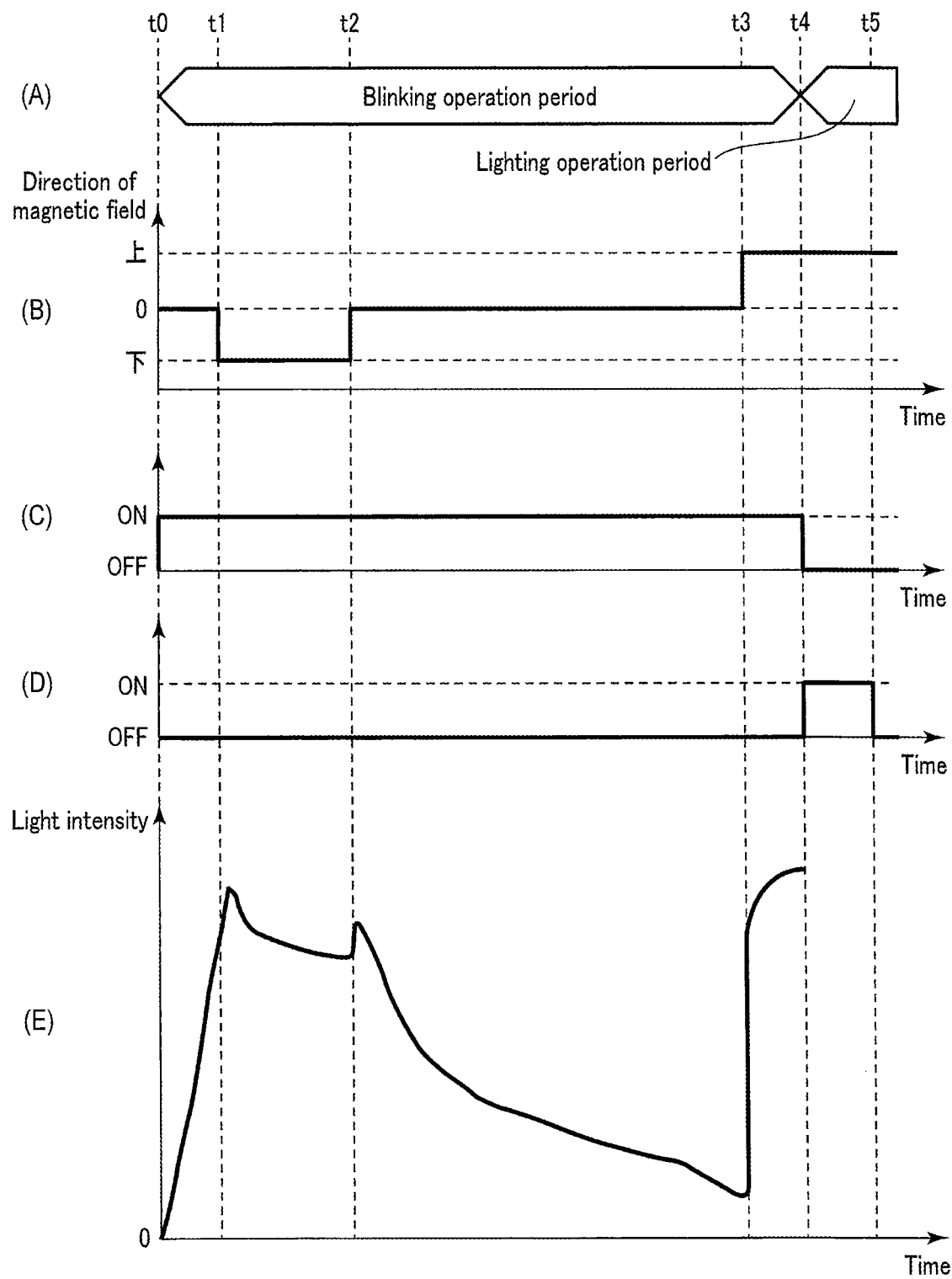
FIG. 5 is a timing chart showing how (A) the period for operating a light source, (B) the period for applying a downward magnetic field or an upward magnetic field, (C) the period for measuring light intensity, (D) the period for counting the number of particles, and (E) the light intensity relate to one another.

FIG. 4 is a flowchart for explaining one example of the sequence of measurement operations according to the embodiment. FIG. 5 is a timing chart showing how (A) the period for operating the light source, (B) the period for applying the downward magnetic field or the upward magnetic field, (C) the period for measuring light intensity, (D) the period for counting the number of particles, and (E) the light intensity relate to one another. The exemplary measurement operations shown in FIG. 4 involves two measurements, namely, the light intensity measurement and the particle number counting. As shown in FIG. 4, the sequence of measurement operations starts upon receipt of an input of instruction for starting the measurement operations from the user via the input interface 16, after the reaction chamber 25 has been filled with the inspection liquid.

(Step S101)

In response to the user's input of a start instruction, the processing circuitry 17 of the sample inspection apparatus 1 performs the light intensity measurement function 172. The processing circuitry 17 with the light intensity measurement function 172 controls the light source 123 to start the light intensity measurement (time t0). More specifically, the processing circuitry 17 causes the light source 123 to perform a periodic blinking action, i.e., the blinking operation, for a given period of the light intensity measurement (from time t0 to time t4). This period of causing the light source 123 to perform the blinking operation may be called a blinking operation period.

In the light intensity measurement, the light source 123 emits light L1 as previously described. The light L1 emitted from the light source 123 passes through the transparent substrate 24 and enters the optical waveguide 23. The light having entered the optical waveguide 23 is deflected and then propagates within the optical waveguide 23 while repeating total reflection. The light having propagated through the optical waveguide 23 is deflected and then ejected toward the photodetector 124 via the transparent substrate 24 and the light-receiving part 122. The optical waveguide 23 here serves as a path of light with an entrance from the transparent substrate 24 and an exit to the transparent substrate 24. That is, the optical waveguide 23 functions in a manner similar to the core (core material) of optical fibers. The double-sided tape 22 and the transparent substrate 24 are made of a material or materials endowing them with respective refractive indexes differing from that of the optical waveguide 23, and as such, light makes total reflection at their boundary with the optical waveguide 23. In other words, the double-sided tape 22 and the transparent substrate 24 together function as a cladding for confining light within the optical waveguide 23.

The photodetector 124 detects the light coming out of the reaction unit 2, namely, the light L2. The photodetector 124 outputs data about intensity of the detected light at predetermined time intervals (e.g., at time intervals synchronized with the blinking operation of the light source 123).

(Step S102)

After starting the light intensity measurement, the processing circuitry 17 with the light intensity measurement function 172 uses, for example, time-frame information included in information stipulating the timing for starting application of the downward magnetic field, to determine whether or not a predetermined time period (first progress period) has elapsed since time t0, that is, whether or not time t1 for starting application of the downward magnetic field has been reached. The first progress period may adopt, for example, the length of time taken for the light intensity to get to a predetermined value from the start of the light intensity measurement. Note that, during the period from time t0 to time t1, the measured light intensity increases. This is attributable to a phenomenon that the inspection liquid, when injected to fill the reaction chamber 25, dissolves a sugar-containing, water-soluble film that is adhered onto the upper face of the optical waveguide 23 beforehand for enhanced preservation stability. The sugar contained may be disaccharides, for example. If it is determined that time t1 has been reached, the operation sequence advances to step S103. Otherwise, a standby state is maintained until time t1.

(Step S103)

Upon reaching time t1, the processing circuitry 17 with the light intensity measurement function 172 starts application of the downward magnetic field. More specifically, the processing circuitry 17 causes the magnetic field generation circuitry 13 to apply the downward magnetic field to the reaction chamber 25 of the reaction unit 2.

Figure 6:
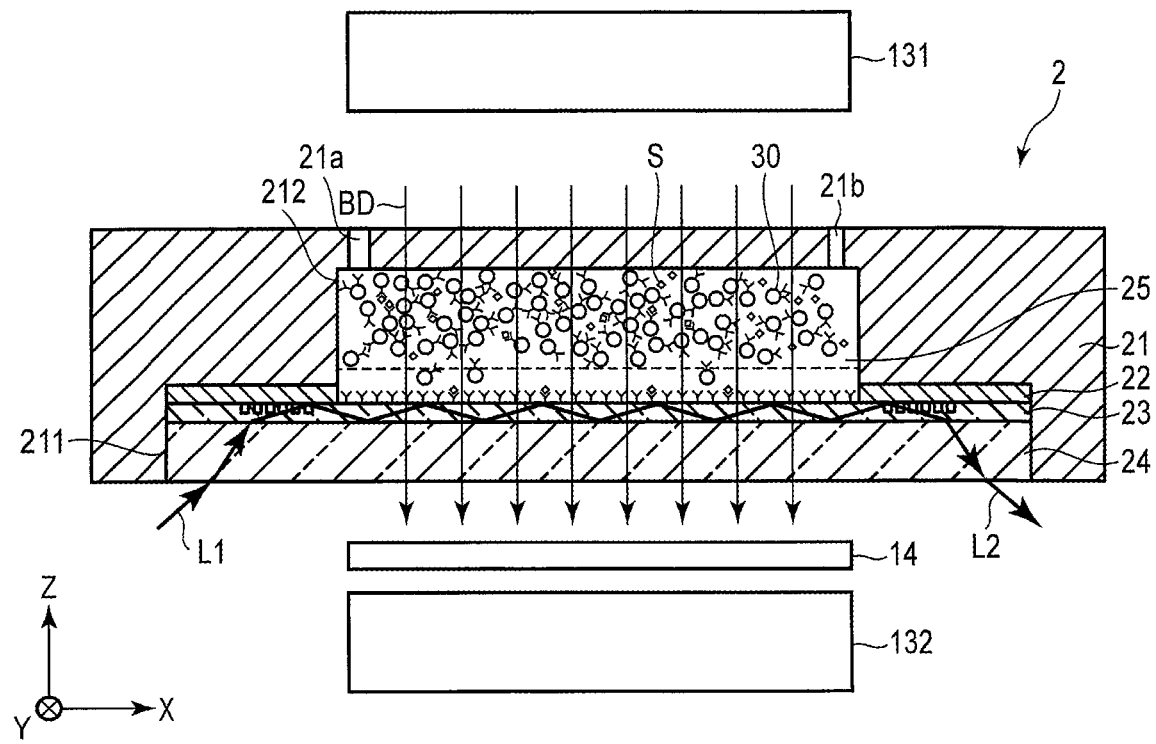
FIG. 6 is a sectional view showing a state inside the reaction mechanism at time t1 indicated in the timing chart of FIG. 5.

FIG. 6 is a sectional view showing the state inside the reaction mechanism at time t1 indicated in the timing chart of FIG. 5. As shown in FIG. 6, the downward magnetic field is applied at time t1. FIG. 6 illustrates the downward magnetic field using vertically down-pointing arrows BD's (extending along a Z-axis).

Figure 7:
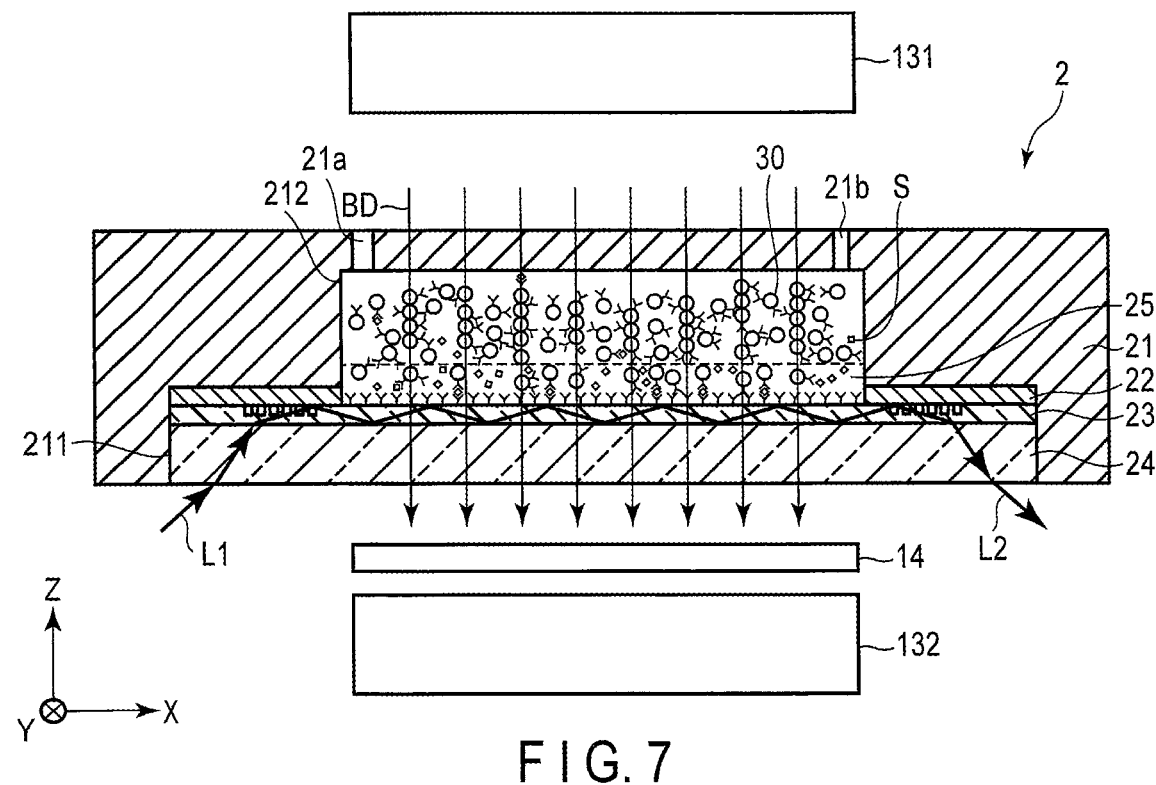
FIG. 7 is a sectional view showing a state inside the reaction mechanism at a time point between time t1 and time t2 indicated in the timing chart of FIG. 5.

FIG. 7 is a sectional view showing the state inside the reaction mechanism at a time point between time t1 and time t2 indicated in the timing chart of FIG. 5. As shown in FIG. 7, the application of the downward magnetic field exerts vertically downward magnetic force on the magnetic particles supporting the first antibodies in the inspection liquid. The magnetic particles with their supporting first antibodies gradually sink down in the reaction chamber 25 toward the upper face of the optical waveguide 23, due to the gravity and the downward magnetic force. Note that, when the magnetic particle settles out, the first antibody supported by this magnetic particle is coupled, via the target substance S as an antigen, to the second antibody immobilized on the upper face of the optical waveguide 23. Accordingly, starting the application of the downward magnetic field increases the number of the magnetic particles near the optical waveguide 23, and therefore decreases the light intensity as shown in FIG. 5.

(Step S104)

After starting the application of the downward magnetic field, the processing circuitry 17 with the light intensity measurement function 172 uses, for example, time-frame information included in information stipulating the timing for stopping the application of the downward magnetic field, to determine whether or not a predetermined time period (second progress period) has elapsed since time t1, that is, whether or not time t2 for stopping the application of the downward magnetic field has been reached. The second progress period may adopt, for example, the length of time taken for the light intensity at time t1 to decline to a predetermined value. If it is determined that time t2 has been reached, the operation sequence advances to step S105. Otherwise, the application of the downward magnetic field continues until time t2.

(Step S105)

Upon reaching time t2, the processing circuitry 17 with the light intensity measurement function 172 stops the application of the downward magnetic field. More specifically, the processing circuitry 17 causes the magnetic field generation circuitry 13 to stop generating and applying the downward magnetic field.

Figure 8:
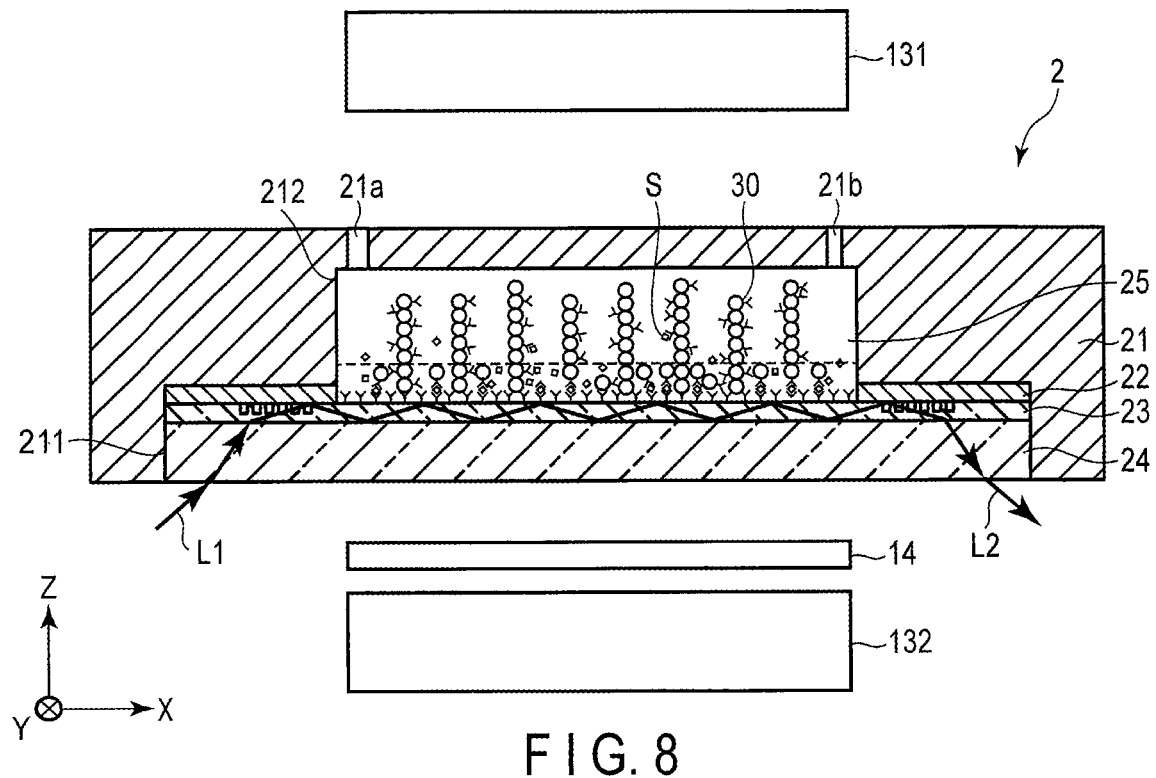
FIG. 8 is a sectional view showing a state inside the reaction mechanism at time t2 indicated in the timing chart of FIG. 5.

FIG. 8 is a sectional view showing the state inside the reaction mechanism at time t2 indicated in the timing chart of FIG. 5. As understood from FIG. 8, immediately after the stop of the application of the downward magnetic field, the magnetic particles supporting the first antibodies keep their bound state (in which the magnetic particles are connected to one another like a short chain extending in alignment with the magnetic line) that has been caused by this downward magnetic field.

Figure 9:
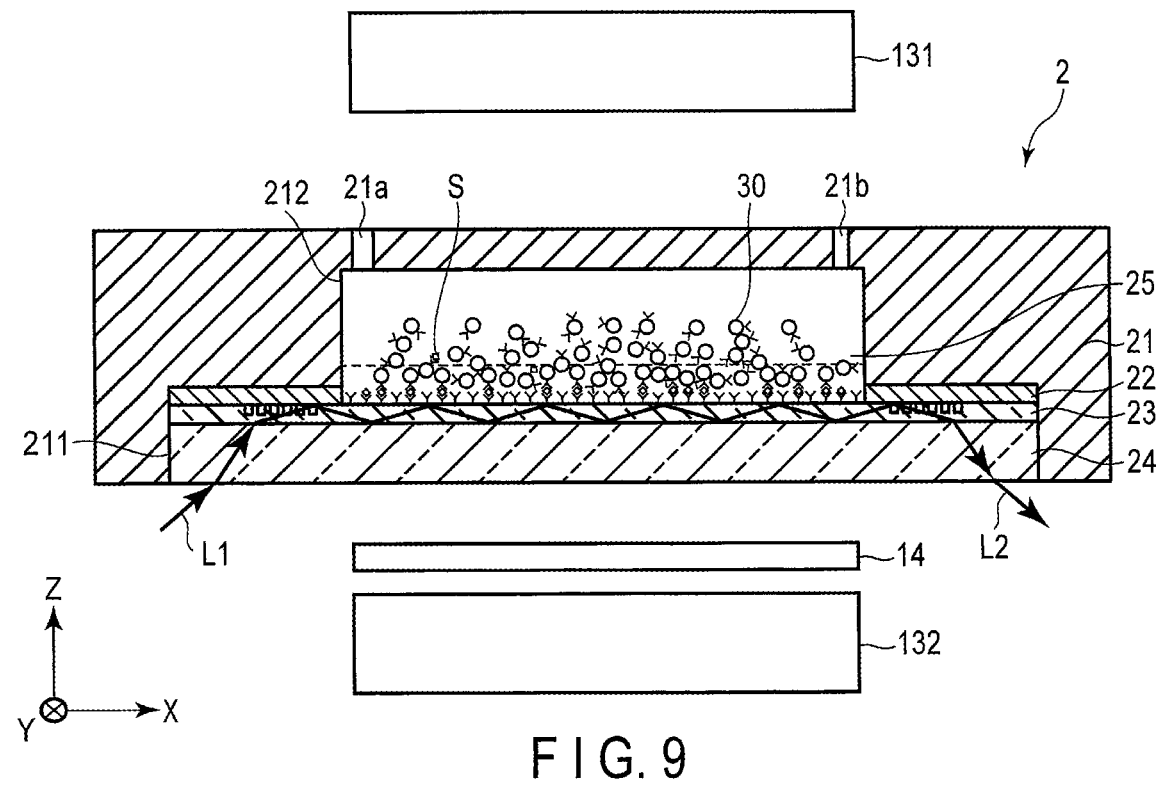
FIG. 9 is a sectional view showing a state inside the reaction mechanism at a time point in the preceding half of the period from time t2 to time t3 indicated in the timing chart of FIG. 5.

FIG. 9 is a sectional view showing the state inside the reaction mechanism at a time point in the preceding half of the period from time t2 to time t3 indicated in the timing chart of FIG. 5. Time t3 represents the timing to start application of the upward magnetic field, which will be described later. When the application of the downward magnetic field is stopped, the magnetic particles supporting the first antibodies are released from the bound state caused by the downward magnetic field, and begin to sink down spontaneously. Accordingly, the number of the magnetic particles increases near the optical waveguide 23. With the application of the downward magnetic field stopped, the light intensity exhibits an overshoot and then gradually declines as shown in FIG. 5. Said overshoot is attributable to a phenomenon that, at the very moment when the magnetic particles which were once connected like a chain are separated apart, more water molecules come to hydrate each loosened magnetic particle to give a larger buoyancy.

FIG. 10 is a sectional view showing the state inside the reaction mechanism at a time point in the succeeding half of the period from time t2 to time t3 indicated in the timing chart of FIG. 5. Here, the magnetic particles supporting the first antibodies finish spontaneously settling out, that is, there are no more magnetic particles supporting the first antibodies that will enter the prescribed sensing area (the area within the reaction chamber 25 and between the broken line, indicated in the drawings, and the optical waveguide 23). In this state, some of the magnetic particles with the first antibodies, located on the upper face of the optical waveguide 23, are specifically coupled via the respective target substances S to the second antibodies immobilized on the upper face of the optical waveguide 23. Such magnetic particles supporting the first antibodies are neatly accumulated on the upper face of the optical waveguide 23. Thus, the sensing area becomes occupied, substantially without a void, by the magnetic particles supporting the first antibodies that include the magnetic particles immobilized via the respective first antibodies.

(Step S106)

After stopping the application of the downward magnetic field, the processing circuitry 17 with the light intensity measurement function 172 uses, for example, time-frame information included in information stipulating the timing for starting application of the upward magnetic field, to determine whether or not a predetermined time period (third progress period) has elapsed since time t2, that is, whether or not time t3 for starting application of the upward magnetic field has been reached. The third progress period may adopt, for example, the length of time taken for the light intensity at time t2 to decline to a predetermined value. If it is determined that time t3 has been reached, the operation sequence advances to step S107. Otherwise, a standby state is maintained until time t3.

(Step S107)

Upon reaching time t3, the processing circuitry 17 with the light intensity measurement function 172 starts application of the upward magnetic field. More specifically, the processing circuitry 17 causes the magnetic field generation circuitry 13 to apply the upward magnetic field to the reaction chamber 25 of the reaction unit 2.

FIG. 11 is a sectional view showing the state inside the reaction mechanism at a time point between time t3 and time t4 indicated in the timing chart of FIG. 5. As shown in FIG. 11, the application of the upward magnetic field exerts vertically upward magnetic force on the magnetic particles supporting the first antibodies in the inspection liquid. FIG. 11 illustrates the upward magnetic field using vertically up-pointing arrows BU's. The upward magnetic force pulls, among the magnetic particles having settled out on the upper face of the optical waveguide 23, the magnetic particles whose first antibodies are not coupled via the antigen to the second antibody immobilized on the upper face of the optical waveguide 23, away from the vicinity (evanescent field) of the optical waveguide 23. That is, only the magnetic particles that each support the first antibody coupled to the second antibody via the antigen remain in the vicinity of the optical waveguide 23. As such, upon start of the application of the upward magnetic field, the light intensity lumps up immediately thereafter and then becomes stable when a certain time passes, as shown in FIG. 5.

(Step S108)

After starting the application of the upward magnetic field, the processing circuitry 17 with the light intensity measurement function 172 uses, for example, time-frame information included in information stipulating the timing for terminating the light intensity measurement, to determine whether or not a predetermined time period (fourth progress period) has elapsed since time t3, that is, whether or not time t4 for terminating the light intensity measurement has been reached. The fourth progress period may adopt, for example, the length of time taken for the light intensity under the measurement to converge. If it is determined that time t4 has been reached, the operation sequence advances to step S109. Otherwise, the measurement is continued until time t4.

(Step S109)

Upon reaching time t4, the processing circuitry 17 with the light intensity measurement function 172 terminates the light intensity measurement. However, the processing circuitry 17 lets the magnetic field generation circuitry 13 to continue the application of the upward magnetic field for the sake of the subsequent particle number counting.

(Step S110)

After terminating the light intensity measurement, or immediately before terminating the light intensity measurement, the processing circuitry 17 with the light intensity measurement function 172 determines whether or not the measured light intensity can be used to specify the presence or absence, and the extent of inclusion, of the target substance S in the measurement sample. Here, for example, the processing circuitry 17 determines that the presence/absence and the extent of the target substance S can be specified, or cannot be specified, based on whether or not the measured light intensity retains a predetermined intensity in comparison with the reference light intensity before the antigen-antibody reaction, or whether or not the measured light intensity has converged at a predetermined value, and so on. If it is determined to be possible to specify the presence/absence and the extent of the target substance S, the operation sequence advances to step S111. If it is not determined to be possible, the operation sequence advances to step S112.

(Step S111)

The processing circuitry 17 with the light intensity measurement function 172 calculates the concentration of the target substance S by, for example, comparing the reference light intensity before the antigen-antibody reaction with the light intensity at time t4. In one concrete implementation, the processing circuitry 17 calculates a falling rate of the light intensity using the light intensity before the antigen-antibody reaction and the light intensity at time t4. The processing circuitry 17 then obtains the concentration of the target substance S that corresponds to the calculated falling rate of the light intensity, using calibration curve data.

(Step S113)

Upon calculating the concentration of the target substance S, the processing circuitry 17 performs the determination function 174. The processing circuitry 17 with the determination function 174 determines the presence or absence, and the extent of inclusion, of the target substance S in the inspection liquid based on the concentration of the target substance S calculated in step S111. In one concrete implementation, the processing circuitry 17 determines "positive" if the concentration of the target substance S is equal to or higher than a threshold, and determines "negative" if the concentration of the target substance S is lower than the threshold.

Note that the processing circuitry 17 may instead use the falling rate of the light intensity to determine the presence or absence, and the extent of inclusion, of the target substance S in the inspection liquid. More concretely, in this case, the processing circuitry 17 determines "positive" if the falling rate of the light intensity is equal to or higher than a threshold, and determines "negative" if the falling rate of the light intensity is lower than the threshold. Thus, this case does not require the concentration of the target substance S to be obtained in step S111 above.

(Step S114)

Upon determining the presence/absence and the extent of the target substance S in the inspection liquid, the processing circuitry 17 performs the system control function 171. The processing circuitry 17 with the system control function 171 causes the display 151 to display the presence/absence and the extent of the target substance S determined in step S113. In one concrete implementation, the processing circuitry 17 causes the display 151 to display the result of determining "negative" or "positive" for the presence/absence and the extent of the target substance S. The processing circuitry 17 may also cause the display 151 to display, together with the determination result, a probability indicative of how probable the determination result is true. Upon finishing step S114, the operation sequence comes to the end.

(Step S112)

On the other hand, if it is not determined to be possible to specify the presence/absence and the extent of the target substance S, the processing circuitry 17 makes a switchover to the particle number count function 173 to start counting. That is, the processing circuitry 17 performs the particle number count function 173. The processing circuitry 17 with the particle number count function 173 controls the light source 123 to start the particle number counting. More specifically, the processing circuitry 17 switches the operation of the light source 123 from the blinking operation to the lighting operation, and causes the light source 123 to perform the lighting operation for a given period of the particle number counting (from time t4 to time t5). This period of causing the light source 123 to perform the lighting operation may be called a lighting operation period.

In the particle number counting, the light source 123 emits light L1. The light L1 propagates within the optical waveguide 23 by repeating total reflection at the boundaries between the optical waveguide 23 and each of the inspection liquid within the reaction chamber 25, the double-sided tape 22, and the transparent substrate 24. There is light penetrating through the boundaries in such a total reflecting state, namely, evanescent light. The evanescent light is scattered by the magnetic particles fixed in the vicinity of the optical waveguide 23.

At a predetermined time point during the particle number counting period, the processing circuitry 17 controls the image sensor 14 to receive the scattered evanescent light and convert the received light into an image signal. The processing circuitry 17 generates an image based on the image signal obtained through the conversion by the image sensor 14. The processing circuitry 17, for example, counts the number of light spots each having a size equal to or greater than a preset size, among the light spots included in the generated image. The light spot having a preset size or greater represents, for example, the magnetic particle coupled to the upper face of the optical waveguide 23 via the first antibody, the target substance S, and the second antibody.

(Step S115)

After starting the particle number counting, the processing circuitry 17 determines whether or not the number of particles has been fully counted, that is, whether or not to terminate the particle number counting. If it is determined that the particle number has been counted, the operation sequence advances to step S116. Otherwise, a standby state is maintained until the particle number has been counted.

(Step S116)

The processing circuitry 17 with the particle number count function 173 terminates the particle number counting.

(Step S117)

Upon terminating the particle number counting, the processing circuitry 17 performs the determination function 174. The processing circuitry 17 with the determination function 174 determines the presence or absence, and the extent of inclusion, of the target substance S in the inspection liquid based on the particle number counted in step S112. For example, the processing circuitry 17 compares the result of the particle number counting with a predetermined particle number to make a final determination for the target substance S in the inspection liquid. In one concrete implementation, the processing circuitry 17 determines "positive" if the counted particle number is equal to or greater than a threshold, and determines "negative" if the counted particle number is less than the threshold.

(Step S118)

Upon making the final determination, the processing circuitry 17 performs the system control function 171. The processing circuitry 17 with the system control function 171 causes the display 151 to display the result of the final determination done in step S117. In one concrete implementation, the processing circuitry 17 causes the display 151 to display the result of determining "negative" or "positive" for the presence/absence and the extent of the target substance S. The processing circuitry 17 may also cause the display 151 to display, together with the determination result, a probability indicative of how probable the determination result is true. Upon finishing step S118, the operation sequence comes to the end.

According to the present embodiment as described above, the sample inspection apparatus 1 uses the light intensity measurement function 172 of the processing circuitry 17 to measure the intensity of light propagating within the optical waveguide in the reaction unit 2, so as to acquire the first inspection index value. The sample inspection apparatus 1 uses the particle number count function 173 of the processing circuitry 17 to acquire the second inspection index value based on the image of the optical waveguide. The sample inspection apparatus 1 further uses the determination function 174 of the processing circuitry 17 to determine the presence or absence, and the extent of inclusion, of the target substance in the inspection liquid based on the first inspection index value and/or the second inspection index value. Accordingly, the sample inspection apparatus 1 of the embodiment can conduct multiple quantitative measurements for the target substance, i.e., the measurement utilizing the attenuation of light and the measurement utilizing the visual information, in a single inspection sequence, and make use of the results of these measurements for the final determination. Moreover, the light propagating within the optical waveguide is also employed for monitoring by the image sensor 14, and accordingly, the sample inspection apparatus 1 of the embodiment eliminates the necessity of having an additional light source for using the image sensor 14.

Modifications of First Embodiment

The first embodiment has assumed that the sample inspection apparatus 1 is adapted to perform the light intensity measurement and then the particle number counting. However, the sample inspection apparatus 1 is not limited to such a configuration. For example, according to the exemplary operations shown in FIG. 4, the display 151 is caused to present the determination result based on the number of particles when the determination result based on the light intensity is not available, but the sample inspection apparatus 1 is not limited to such an operation sequence.

In another exemplary implementation, the sample inspection apparatus 1 may conduct the light intensity measurement and the particle number counting simultaneously or in parallel with each other. More specifically, and for example, upon determining in step S108 that the light intensity has converged, the processing circuitry 17 performs the particle number count function 173. The processing circuitry 17 with the particle number count function 173 generates an image for the scattered evanescent light originated from, for example, the light emitted by the light source 123 in the blinking operation. The processing circuitry 17 then counts the number of light spots each having, for example, a size equal to or greater than a preset size, among the light spots included in the generated image.

Also, the result of the light intensity measurement (first inspection index value) and the result of the measurement based on the output from the image sensor 14 (second inspection index value) may be presented through the display 151, irrespective of whether the determination is made or not.

The first embodiment has assumed that the sample inspection apparatus 1 is adapted to perform the light intensity measurement and the particle number counting in a series of operations. However, the sample inspection apparatus 1 is not limited to such a configuration. The sample inspection apparatus 1 may also be adapted to perform the light intensity measurement and the particle number counting independently from each other, so that the inspection index from the result of detection by the photodetection circuitry and the inspection index from the result of detection by the image sensor are separately acquired, and the determination, etc., based on such indexes are presented through the display 151.

The first embodiment has assumed that the sample inspection apparatus 1 is adapted to display the presence/absence and the extent of the target substance, determined based on the first inspection index value obtained from the result of detection by the photodetection circuitry and/or the second inspection index value obtained from the result of detection by the image sensor. However, what is displayed is not limited to the presence/absence and the extent of inclusion of the target substance. The first inspection index value and the second inspection index value themselves may be displayed on the display 151.

The first embodiment has assumed that the sample inspection apparatus 1 is adapted to acquire the first inspection index value using the processing circuitry 17 with the light intensity measurement function 172, and the second inspection index value using the processing circuitry 17 with the particle number count function 173. However, the inspection index values acquired by the processing circuitry 17 are not limited to these. The processing circuitry 17 may acquire a third inspection index value for the target substance from the first and second inspection index values. The third inspection index value is, for example, a value for the correlation between the first inspection index value and the second inspection index value. The first inspection index value and the second inspection index value are outcomes of the measurement (counting) of the same subject, and therefore, they are expected to have a high correlation. For example, the processing circuitry 17 may issue a low-correlation notice to the user based on the third inspection index value indicating that the correlation between the first inspection index value and the second inspection index value is low.

Second Embodiment

The first embodiment has assumed the sequence of measurement operations in which the possibility of specifying the presence or absence, and the extent of inclusion, of the target substance S in the measurement sample is determined after or immediately before terminating the light intensity measurement. Also, the modification of the first embodiment has assumed the sequence of measurement operations in which, without making such a determination, the light intensity measurement and the particle number counting are conducted simultaneously or in parallel with each other. In the sequence of measurement operations according to the second embodiment as will be described, the light intensity measurement is performed and then the presence or absence, etc. of the target substance are determined while omitting the determination as to the possibility of specifying the presence or absence, etc., and subsequently, whether or not to conduct the particle number counting is determined.

Figure 12:
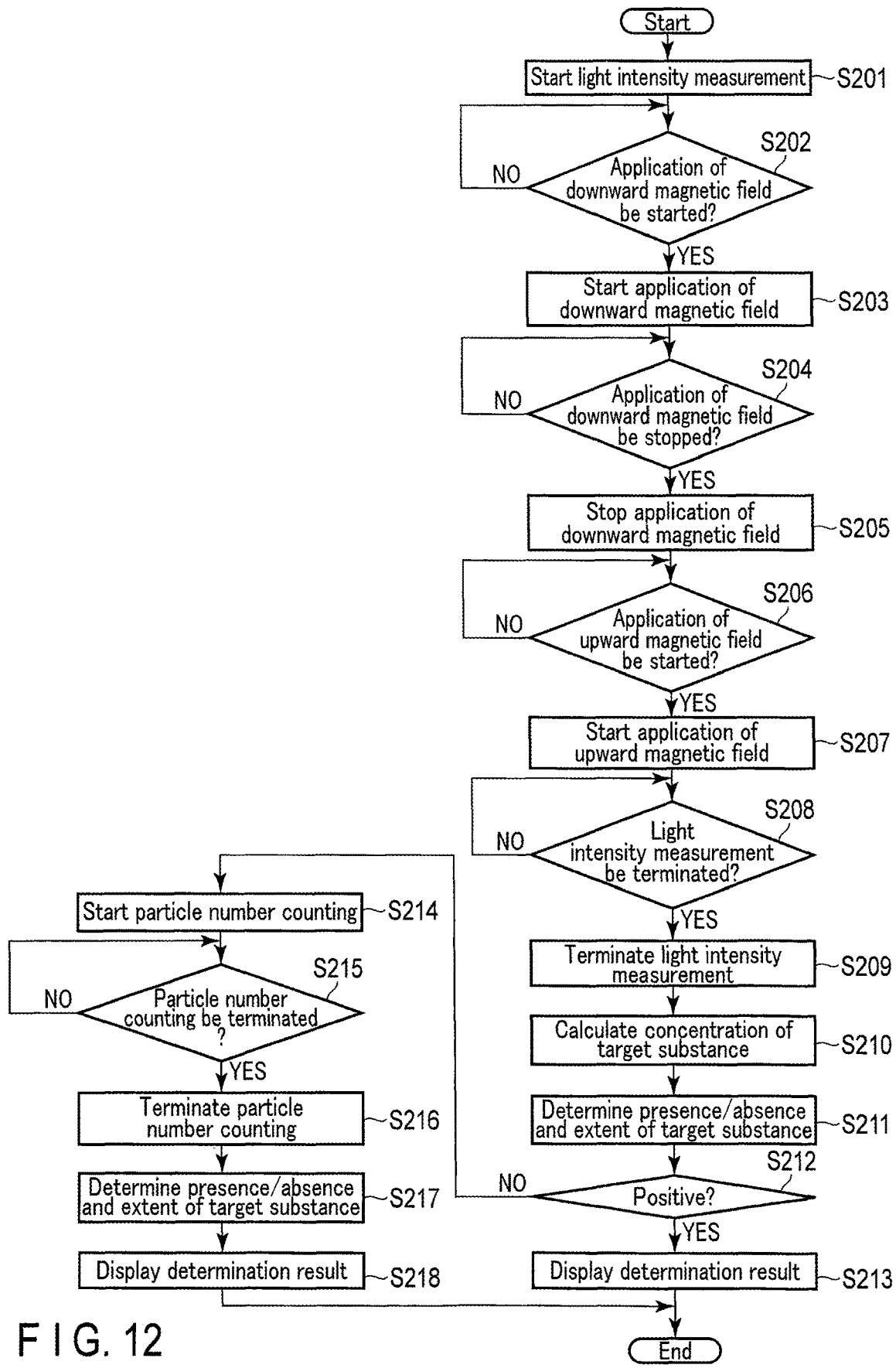
FIG. 12 is a flowchart for explaining one example of a sequence of measurement operations according to a second embodiment.

FIG. 12 is a flowchart for explaining one example of the sequence of measurement operations according to the second embodiment. The measurement operations shown in FIG. 12 involves two measurements, namely, the light intensity measurement and the particle number counting. A timing chart for the light intensity measurement may be the same as that shown in FIG. 5. As shown in FIG. 12, the sequence of measurement operations starts upon receipt of an input of instruction for starting the measurement operations from the user via the input interface 16, after the reaction chamber 25 has been filled with the inspection liquid.

Note that the operations performed in steps S201 to S209 in FIG. 12 are equivalent to the operations performed in steps S101 to S109, respectively, so their description will be omitted. Upon finishing step S209, the operation sequence advances to step S210.

(Step S210)

The processing circuitry 17 with the light intensity measurement function 172 calculates the concentration of the target substance S by, for example, comparing the reference light intensity before the antigen-antibody reaction with the light intensity at time t4. In one concrete implementation, the processing circuitry 17 calculates a falling rate of the light intensity using the light intensity before the antigen-antibody reaction and the light intensity at time t4. The processing circuitry 17 then obtains the concentration of the target substance S that corresponds to the calculated falling rate of the light intensity, using calibration curve data.

(Step S211)

Upon calculating the concentration of the target substance S, the processing circuitry 17 performs the determination function 174. The processing circuitry 17 with the determination function 174 determines the presence or absence, and the extent of inclusion, of the target substance S in the inspection liquid based on the concentration of the target substance S calculated in step S210. In one concrete implementation, the processing circuitry 17 determines "positive" if the concentration of the target substance S is equal to or higher than a threshold, and determines "negative" if the concentration of the target substance S is lower than the threshold.

Note that the processing circuitry 17 may instead use the falling rate of the light intensity to determine the presence or absence, and the extent of inclusion, of the target substance S in the inspection liquid. More concretely, in this case, the processing circuitry 17 determines "positive" if the falling rate of the light intensity is equal to or higher than a threshold, and determines "negative" if the falling rate of the light intensity is lower than the threshold. Thus, this case does not require the concentration of the target substance S to be obtained in step S210 above.

(Step S212)

Upon determining the presence or absence, and the extent of inclusion, of the target substance S in the inspection liquid, the processing circuitry 17 performs the system control function 171. The processing circuitry 17 with the system control function 171 refers to the result of determination in step S211 to determine whether or not to conduct the particle number counting. More specifically, in response to the determination result being "positive", the processing circuitry 17 proceeds to the operation in step S213, instead of conducting the particle number counting. On the other hand, in response to the determination result not being "positive", that is, if the determination result indicates "negative", the processing circuitry 17 proceeds to the operation in step S214 where the particle number counting is conducted.

(Step S213)

After having determined "positive" in step S211, the processing circuitry 17 causes the display 151 to display this determination result that a positive state has been determined from the light intensity measurement. The processing circuitry 17 may cause the display 151 to display, together with the determination result, a probability indicative of how probable the determination result is true. Upon finishing step S213, the operation sequence comes to the end.

(Step S214)

After having determined "negative" in step S211, the processing circuitry 17 makes a switchover to the particle number count function 173 to start counting. The operations performed in subsequent steps S215 to S217 are equivalent to the operations performed in steps S115 to S117, respectively, so their description will be omitted.

(Step S218)

Upon making the final determination in step S217, the processing circuitry 17 performs the system control function 171. The processing circuitry 17 with the system control function 171 causes the display 151 to display the result of the final determination. In one concrete implementation, the processing circuitry 17 causes the display 151 to display the result of determining "negative" or "positive" for the presence/absence and the extent of the target substance S. The processing circuitry 17 may cause the display 151 to display, together with the determination result, a probability indicative of how probable the determination result is true. The processing circuitry 17 may further give the user a note or the like of the preceding determination result that a negative state has been determined from the light intensity measurement, together with the result of determination from the particle number counting. Upon finishing step S218, the operation sequence comes to the end.

According to at least one embodiment in the foregoing description, the sample inspection apparatus 1 capable of accurately determining the presence or absence, and the extent of inclusion, of the target substance in the measurement sample can be realized.

The term "processor" used in the disclosure herein refers to, for example, a central processing unit (CPU) or a graphics processing unit (CPU), or various types of circuitry which may be an application-specific integrated circuit (ASIC), a programmable logic device (such as a simple programmable logic device (SPLD), a complex programmable logic device (CPLD), or a field programmable gate array (FPGA)), and so on. The processor reads programs stored in the storage circuitry and executes them to realize the intended functions. The programs may be incorporated directly in circuits of the processor, instead of being stored in the storage circuitry. According to such implementation, the processor reads the programs incorporated in its circuits and executes them to realize the functions. The embodiments herein do not limit the processor to a single circuitry-type processor. A plurality of independent circuits may be combined and integrated as one processor to realize the intended functions. Furthermore, multiple components or features as given in the embodiments may be integrated as one processor to realize their functions.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and spirit of the inventions.

The invention claimed is:

1. A sample inspection apparatus comprising:
   a photodetection circuitry configured to have light incident on an optical waveguide in an inspection container and to detect the light having propagated within the optical waveguide and coming out of the optical waveguide;
   an image sensor configured to acquire an image signal for scattered light originated from the light propagating within the optical waveguide, the scattered light being scattered by one or more particles in a vicinity of the optical waveguide;
   processing circuitry configured to acquire one or more inspection index values based on at least one of an output of the photodetection circuitry or an output of the image sensor, including
      acquiring, based on a result of detection by the photodetection circuitry, a first inspection index value for an amount of a target substance that can be included in a sample contained in the inspection container, and
      acquiring, based on the image signal acquired by the image sensor, a second inspection index value for the amount of the target substance; and
   an output interface configured to output, as a result of processing by the processing circuitry, at least one of the first inspection index value or the second inspection index value.

2. The sample inspection apparatus according to claim 1, wherein
   the processing circuitry is configured to acquire, based on the image signal acquired by the image sensor, a plurality of different inspection index values for an amount of a target substance that can be included in a sample contained in the inspection container, and
   the output interface is configured to output, as the result of processing, one or a combination of the inspection index values.

3. The sample inspection apparatus according to claim 1, wherein
   the processing circuitry is configured to acquire a third inspection index value for the amount of the target substance from the first inspection index value and the second inspection index value, and
   the output interface is configured to output, as the result of processing, the third inspection index value.

4. The sample inspection apparatus according to claim 1, wherein
   the processing circuitry is configured to
      determine, based on one or both of the first inspection index value and the second inspection index value, presence or absence and an extent of inclusion of the target substance in the sample, and
   the output interface is configured to output, as the result of processing, the presence or absence and the extent of inclusion of the target substance.

5. The sample inspection apparatus according to claim 1, wherein
   the processing circuitry is configured to
      determine, based on the first inspection index value, presence or absence and an extent of inclusion of the target substance in the sample, and
   the output interface is configured to output, as the result of processing, the presence or absence and the extent of inclusion of the target substance.

6. The sample inspection apparatus according to claim 1, wherein the image sensor and the optical waveguide are adapted so that the image sensor is disposed vertically below the optical waveguide.

7. The sample inspection apparatus according to claim 1, wherein
   the optical waveguide is disposed so that when an inspection liquid is contained in the inspection container, one face of the optical waveguide is in contact with the inspection liquid, and
   the image sensor is configured to acquire the image signal using evanescent light occurring at a boundary between the inspection liquid and the optical waveguide and scattered by said one or more particles.

8. The sample inspection apparatus according to claim 1, wherein the processing circuitry is configured to calculate, as the first inspection index value, a value indicative of a content of the target substance based on a change in light intensity occurring as a reaction in the sample proceeds, the reaction using a first component having a property of reacting with the target substance and a second component immobilized on a face of the optical waveguide and having a property of reacting with the target substance.

9. The sample inspection apparatus according to claim 1, wherein
   the photodetection circuitry is configured to detect light emitted from a light source in a blinking operation, entering the optical waveguide, propagating within the optical waveguide, and coming out of the optical waveguide, and
   the image sensor is configured to acquire the image signal using scattered light originated from light that is emitted from a light source in a lighting operation, entering the optical waveguide, and propagating within the optical waveguide.

10. A sample inspection method comprising:

detecting, by a photodetection circuitry configured to have light incident on an optical waveguide in an inspection container, the light having propagated within the optical waveguide and coming out of the optical waveguide;

acquiring, by an image sensor, an image signal for scattered light originated from the light propagating within the optical waveguide, the scattered light being scattered by one or more particles in a vicinity of the optical waveguide;

acquiring, by processing circuitry, one or more inspection index values based on at least one of an output of the photodetection circuitry or an output of the image sensor, the acquiring including acquiring, based on a result of detection by the photodetection circuitry, a first inspection index value for an amount of a target substance that can be included in a sample contained in the inspection container, and acquiring, based on the image signal acquired by the image sensor, a second inspection index value for the amount of the target substance; and outputting, by an output interface, at least one of the first inspection index value or the second inspection index value.

* * * * *